United States Patent
Park et al.

(10) Patent No.: US 10,822,486 B2
(45) Date of Patent: Nov. 3, 2020

(54) THERMOPLASTIC RESIN COMPOSITION AND MOLDED ARTICLE FORMED THEREFROM

(71) Applicant: LOTTE ADVANCED MATERIALS CO., LTD., Yeosu-si (KR)

(72) Inventors: Ji Eun Park, Uiwang-si (KR); Kee Hae Kwon, Uiwang-si (KR); In Choi Kim, Uiwang-si (KR); Hyeong Seob Shin, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 13 days.

(21) Appl. No.: 16/327,980

(22) PCT Filed: Aug. 25, 2017

(86) PCT No.: PCT/KR2017/009316
§ 371 (c)(1),
(2) Date: Feb. 25, 2019

(87) PCT Pub. No.: WO2018/038573
PCT Pub. Date: Mar. 1, 2018

(65) Prior Publication Data
US 2019/0185655 A1    Jun. 20, 2019

(30) Foreign Application Priority Data
Aug. 26, 2016 (KR) .......................... 10-2016-0108950

(51) Int. Cl.
| *C08L 25/12* | (2006.01) |
| *C08L 51/04* | (2006.01) |
| *C08L 33/06* | (2006.01) |
| *C08L 33/20* | (2006.01) |
| *C08L 25/04* | (2006.01) |

(52) U.S. Cl.
CPC .............. *C08L 25/12* (2013.01); *C08L 25/04* (2013.01); *C08L 33/06* (2013.01); *C08L 33/20* (2013.01); *C08L 51/04* (2013.01); *C08L 2205/025* (2013.01); *C08L 2205/035* (2013.01)

(58) Field of Classification Search
CPC ........... C08L 2205/035; C08L 2205/03; C08L 25/12; C08L 51/04; C08L 33/06
See application file for complete search history.

(56) References Cited

U.S. PATENT DOCUMENTS

| 4,885,335 | A | 12/1989 | Gallucci |
| 5,306,770 | A * | 4/1994 | Kojina .................. C08L 51/006 525/64 |
| 7,417,088 | B2 | 8/2008 | Ahn et al. |
| 7,781,523 | B2 | 8/2010 | Kang et al. |
| 8,201,014 | B2 | 6/2012 | Lam et al. |
| 2002/0019182 | A1* | 2/2002 | Ishibashi .................. C08K 7/14 442/59 |
| 2004/0024122 | A1 | 2/2004 | Chang et al. |
| 2006/0252875 | A1* | 11/2006 | Kang .................. C08L 23/0869 524/502 |
| 2007/0287799 | A1* | 12/2007 | Ha .......................... C08L 25/12 525/71 |

FOREIGN PATENT DOCUMENTS

| KR | 10-2000-0055258 A | 9/2000 |
| KR | 10-2006-0019415 A | 3/2006 |
| KR | 10-2007-0027775 A | 3/2007 |
| KR | 10-0726486 B1 | 6/2007 |
| WO | 2018/038573 A1 | 3/2018 |

OTHER PUBLICATIONS

International Search Report in counterpart International Application No. PCT/KR2017/009316 dated Nov. 30, 2017, pp. 1-4.

* cited by examiner

*Primary Examiner* — Jeffrey C Mullis
(74) *Attorney, Agent, or Firm* — Additon, Higgins & Pendleton, P.A.

(57) ABSTRACT

A thermoplastic resin composition of the present invention comprises: an acrylate-based rubber-modified vinyl-based graft copolymer; aromatic vinyl-cyanide vinyl-based copolymer resin; a first dulling agent; and a second dulling agent, wherein the first dulling agent is a copolymer (PS-g-SAN) in which a styrene-acrylonitrile copolymer is graft-polymerized in polystyrene, and the second dulling agent is a copolymer in which a styrene-acrylonitrile copolymer is graft-polymerized in a poly(ethylene-co-glycidyl methacrylate). The thermoplastic resin composition has excellent low-light properties, impact resistance and fluidity.

13 Claims, No Drawings

THERMOPLASTIC RESIN COMPOSITION AND MOLDED ARTICLE FORMED THEREFROM

TECHNICAL FIELD

The present invention relates to a thermoplastic resin composition and a molded article formed therefrom. More particularly, the present invention relates to a thermoplastic resin composition, which exhibits good properties in terms of low gloss, impact resistance, fluidity, and the like, and a molded article formed therefrom.

BACKGROUND ART

Thermoplastic resins are useful as interior/exterior materials for electric/electronic products, automobiles, and buildings, leisure products, and the like due to lower specific gravity than glass or metal and good properties in terms of formability and impact resistance. Particularly, in order to be applied as interior/exterior materials for automobiles, electric/electronic products, and the like, a thermoplastic resin is required to realize various colors while exhibiting good weather resistance even without plating. Further, the thermoplastic resin is required to exhibit good mechanical properties and a pleasant appearance after molding.

Among such thermoplastic resins, an acrylate-based rubber-modified vinyl copolymer resin, such as an acrylate-styrene-acrylonitrile copolymer resin (ASA resin), is free from π-bonds in the rubber to exhibit good weather resistance through reduction in decomposition by UV light, has lower specific gravity than glass or metal, and exhibits good properties in terms of formability, chemical resistance, thermal stability, and the like to be applied as interior/exterior materials for automobiles.

Recently, with increasing demand for low gloss materials providing an aesthetically pleasant appearance, a thermoplastic resin composition prepared by adding a matting agent, such as a high crosslinking type matting agent, inorganic fillers, for example, talc, to an acrylate-based rubber-modified vinyl copolymer resin is being developed.

However, the thermoplastic resin composition prepared by adding a conventional matting agent, such as a high crosslinking type matting agent and the like, has low fluidity to be applied to an injection-molded article and can suffer from deterioration in impact resistance, external appearance, and the like.

Therefore, there is a need for a thermoplastic resin composition which exhibits good properties in terms of low gloss, impact resistance, fluidity, and property balance therebetween to be advantageously used as interior/exterior materials for automobiles.

The background technique of the present invention is disclosed in Korean Patent Laid-open Publication No. 2000-0055258 and the like.

DISCLOSURE

Technical Problem

It is an object of the present invention to provide a thermoplastic resin composition that exhibits good properties in terms of low gloss, impact resistance, and fluidity, and a molded article formed therefrom.

The above and other objects of the present invention can be achieved by the present invention described below.

Technical Solution

One aspect of the present invention relates to thermoplastic resin composition. The thermoplastic resin composition includes: an acrylate-based rubber-modified vinyl graft copolymer; an aromatic vinyl-vinyl cyanide copolymer resin; a first matting agent; and a second matting agent, wherein the first matting agent is a copolymer (PS-g-SAN) prepared through graft copolymerization of a styrene-acrylonitrile copolymer to polystyrene and the second matting agent is a copolymer (EGMA-g-SAN) prepared through graft copolymerization of a styrene-acrylonitrile copolymer to poly(ethylene-co-glycidyl methacrylate).

In one embodiment, the thermoplastic resin composition may include about 0.1 parts by weight to about 10 parts by weight of the first matting agent and about 0.1 parts by weight to about 10 parts by weight of the second matting agent relative to about 100 parts by weight of a base resin including about 20 wt % to about 50 wt % of the acrylate-based rubber-modified vinyl graft copolymer and about 50 wt % to about 80 wt % of the aromatic vinyl-vinyl cyanide copolymer resin.

In one embodiment, the first matting agent and the second matting agent may be present in a weight ratio of about 1:0.5 to about 1:2.

In one embodiment, the acrylate-based rubber-modified vinyl graft copolymer may be prepared through graft copolymerization of a monomer mixture including an aromatic vinyl monomer and a vinyl cyanide monomer to an acrylate-based rubber polymer.

In one embodiment, the aromatic vinyl-vinyl cyanide copolymer resin may include at least one of a copolymer of styrene and acrylonitrile, a copolymer of styrene, α-methylstyrene and acrylonitrile, and a copolymer of α-methylstyrene and acrylonitrile.

In one embodiment, the first matting agent may have a weight average molecular weight of about 1,000,000 g/mol to about 10,000,000 g/mol.

In one embodiment, the thermoplastic resin composition may have a gloss of about 1 GU to about 5 GU, as measured at an angle of 60° in accordance with ASTM D523.

In one embodiment, the thermoplastic resin composition may have a melt flow index (MI) of about 2.5 g/10 min to about 6 g/10 min, as measured at 220° C. under a load of 10 kg in accordance with ASTM D1238.

In one embodiment, the thermoplastic resin composition may have a notched Izod impact strength of about 20 kgf·cm/cm to about 45 kgf·cm/cm, as measured on a ⅛" thick specimen in accordance with ASTM D256.

Another aspect of the present invention relates to a molded article formed from the thermoplastic resin composition as set forth above.

Advantageous Effects

The present invention provides a thermoplastic resin composition, which exhibits good properties in terms of low gloss, impact resistance, fluidity, and the like to be advantageously used as interior/exterior materials for automobiles, and a molded article formed therefrom.

BEST MODE

Hereinafter, embodiments of the present invention will be described in detail.

A thermoplastic resin composition according to the present invention includes: (A) an acrylate-based rubber-modified vinyl graft copolymer; (B) an aromatic vinyl-vinyl cyanide copolymer resin; (C) a first matting agent; and (D) a second matting agent.

(A) Acrylate-Based Rubber-Modified Vinyl Graft Copolymer

An acrylate-based rubber-modified vinyl graft copolymer according to one embodiment of the invention serves to improve weather resistance, impact resistance, and chemical resistance of the thermoplastic resin composition and may be prepared through graft polymerization of a monomer mixture including an aromatic vinyl monomer and a vinyl cyanide monomer to an acrylate-based rubber polymer. For example, the acrylate-based rubber-modified vinyl graft copolymer may be prepared through graft polymerization of the monomer mixture including the aromatic vinyl monomer and the vinyl cyanide monomer to the acrylate-based rubber polymer, and may further include a monomer for imparting formability and thermal resistance to the monomer mixture, as needed. Here, polymerization may be performed by any typical polymerization method known in the art, such as emulsion polymerization, suspension polymerization, and the like. In addition, the acrylate-based rubber-modified vinyl graft copolymer may have a core (rubber polymer)-shell (copolymer of the monomer mixture) structure, without being limited thereto.

Examples of the acrylate-based rubber polymer may include an alkyl (meth)acrylate rubber, and a copolymer of an alkyl (meth)acrylate and an aromatic vinyl-based compound, without being limited thereto. These may be used alone or as a mixture thereof. For example, the acrylate-based rubber polymer may include a $C_2$ to $C_{10}$ alkyl acrylate rubber, a copolymer of a $C_2$ to $C_{10}$ alkyl acrylate and styrene, and a combination thereof, specifically butyl acrylate, a copolymer of butyl acrylate and styrene, and a combination thereof. Here, the copolymer of the alkyl (meth)acrylate and the aromatic vinyl-based compound may be prepared by copolymerization of about 70 wt % to about 90 wt % of the alkyl (meth)acrylate and about 10 wt % to about 30 wt % of the aromatic vinyl-based compound, without being limited thereto.

In some embodiments, the acrylate-based rubber polymer (rubber particles) may have an average particle diameter (Z-average) of about 0.1 μm to about 0.5 μm, for example, about 0.15 μm to about 0.4 μm. Within this range, the thermoplastic resin composition can exhibit good properties in terms of weather resistance, impact resistance, chemical resistance, and the like. Here, the average particle diameter (Z-average) was measured by a well-known method using a dynamic light scattering particle analyzer.

In some embodiment, the acrylate-based rubber polymer may be a mixture of acrylate-based rubber polymers having different average particle diameters. For example, the acrylate-based rubber polymer may be a mixture of about 40 wt % to about 80 wt % of a first acrylate-based rubber polymer having an average particle diameter of about 0.1 μm to about 0.2 μm and about 20 wt % to about 60 wt % of a second acrylate-based rubber polymer having an average particle diameter of greater than about 0.2 μm to about 0.5 μm or less, in which the mixture of the first and second acrylate-based rubber polymers has a bimodal particle size distribution, without being limited thereto. In use of the mixture of the acrylate-based rubber polymers, it is possible to obtain a thermoplastic resin composition having uniform impact resistance.

In some embodiments, the acrylate-based rubber polymer may be present in an amount of about 30 wt % to about 70 wt %, for example, about 40 wt % to about 60 wt %, based on 100 wt % of the acrylate-based rubber-modified vinyl graft copolymer, and the monomer mixture (including the aromatic vinyl monomer and the vinyl cyanide monomer) may be present in an amount of about 30 wt % to about 70 wt %, for example, about 40 wt % to about 60 wt %, based on 100 wt % of the acrylate-based rubber-modified vinyl graft copolymer. Within these ranges, the thermoplastic resin composition can exhibit good properties in terms of weather resistance, impact resistance, chemical resistance, and the like.

In some embodiments, the aromatic vinyl monomer is a monomer graft-polymerizable with the rubber polymer, and examples of the aromatic vinyl monomer may include styrene, α-methylstyrene, β-methylstyrene, p-methylstyrene, p-t-butylstyrene, ethyl styrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can exhibit good properties in terms of formability, coloration, and the like.

In some embodiments, the vinyl cyanide monomer is a monomer copolymerizable with the aromatic vinyl monomer, and examples of the vinyl cyanide monomer may include acrylonitrile, methacrylonitrile, ethacrylonitrile, phenylacrylonitrile, α-chloroacrylonitrile, and fumaronitrile, without being limited thereto. These may be used alone or as a mixture thereof. For example, acrylonitrile or methacrylonitrile may be used as the vinyl cyanide monomer. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can exhibit good properties in terms of chemical resistance, mechanical properties, and the like.

Examples of the monomer for imparting formability and thermal resistance may include (meth)acrylic acid, maleic anhydride, and N-substituted maleimide, without being limited thereto. The monomer for imparting formability and thermal resistance may be present in an amount of about 15 wt % or less, for example, about 0.1 wt % to about 10 wt %, based on 100 wt % of the monomer mixture. Within this range, the monomer can impart formability and thermal resistance to the thermoplastic resin composition without deterioration in other properties.

In some embodiments, the acrylate-based rubber-modified vinyl graft copolymer may be an acrylate-styrene-acrylonitrile graft copolymer (g-ASA), without being limited thereto.

In some embodiments, the acrylate-based rubber-modified vinyl graft copolymer may be present in an amount of about 20 wt % to about 50 wt %, for example, about 25 wt % to about 45 wt %, based on 100 wt % of a base resin (the acrylate-based rubber-modified vinyl graft copolymer and the aromatic vinyl-vinyl cyanide copolymer resin). Within this range, the thermoplastic resin composition can exhibit good properties in terms of low gloss, impact resistance, fluidity, weather resistance, and balance therebetween.

(B) Aromatic Vinyl-Vinyl Cyanide Copolymer Resin

The aromatic vinyl-vinyl cyanide copolymer resin according to one embodiment of the invention serves to improve formability and stability of the thermoplastic resin composition, and is a polymer of a monomer mixture including an aromatic vinyl monomer and a vinyl cyanide monomer. For example, the aromatic vinyl-vinyl cyanide copolymer resin is a copolymer including a repeat unit derived from the aromatic vinyl monomer and a repeat unit derived from the vinyl cyanide monomer and may be prepared through a well-known polymerization method of the monomer mixture. In addition, as needed, a monomer for imparting formability and thermal resistance is further added to the monomer mixture to provide an aromatic vinyl-vinyl cyanide copolymer further including a repeat unit derived from the monomer for imparting formability and thermal resistance.

In some embodiments, the aromatic vinyl monomer is a monomer polymerizable with the vinyl cyanide monomer to form the repeat unit derived from the aromatic vinyl monomer, and examples of the aromatic vinyl monomer may include styrene, α-methylstyrene, β-methyl styrene, p-methyl styrene, p-t-butyl styrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer (repeat unit derived from the aromatic vinyl monomer) may be present in an amount of about 50 wt % to about 90 wt %, for example, about 60 wt % to about 85 wt %, based on 100 wt % of the monomer mixture. Within this range, the thermoplastic resin composition can exhibit good properties in terms of formability, stability, and the like.

In some embodiments, the vinyl cyanide monomer is a monomer polymerizable with the aromatic vinyl monomer to form the repeat unit derived from the vinyl cyanide monomer, and examples of the vinyl cyanide monomer may include acrylonitrile, methacrylonitrile, ethacrylonitrile, phenylacrylonitrile, α-chloroacrylonitrile, and fumaronitrile, without being limited thereto. These may be used alone or as a mixture thereof. For example, acrylonitrile or methacrylonitrile may be used as the vinyl cyanide monomer. The vinyl cyanide monomer (repeat unit derived from the vinyl cyanide monomer) may be present in an amount of about 10 wt % to about 50 wt %, for example, about 15 wt % to about 40 wt %, based on 100 wt % of the monomer mixture. Within this range, the thermoplastic resin composition can exhibit good properties in terms of chemical resistance, mechanical properties, and the like.

Examples of the monomer for imparting formability and thermal resistance may include (meth)acrylic acid, maleic anhydride, and N-substituted maleimide, without being limited thereto. The monomer for imparting formability and thermal resistance may be present in an amount of about 15 wt % or less, for example, about 0.1 wt % to about 10 wt %, based on 100 wt % of the monomer mixture. Within this range, the monomer can impart formability and thermal resistance to the thermoplastic resin composition without deterioration in other properties.

In some embodiments, the aromatic vinyl-vinyl cyanide copolymer resin may include at least one of a copolymer of styrene and acrylonitrile, a copolymer of styrene, α-methylstyrene and acrylonitrile, and a copolymer of α-methylstyrene and acrylonitrile.

In some embodiments, the aromatic vinyl-vinyl cyanide copolymer may have a weight average molecular weight of about 80,000 g/mol to about 250,000 g/mol, for example, about 90,000 g/mol to about 200,000 g/mol, as measured by gel permeation chromatography (GPC). Within this range, the thermoplastic resin composition can exhibit good properties in terms of thermal resistance, impact resistance, formability, and the like.

In some embodiments, the aromatic vinyl-vinyl cyanide copolymer may be present in an amount of about 50 wt % to about 80 wt %, for example, about 55 wt % to about 75 wt %, based on 100 wt % of the base resin (acrylate-based rubber-modified vinyl graft copolymer and the aromatic vinyl-vinyl cyanide copolymer resin). Within this range, the thermoplastic resin composition can exhibit good properties in terms of low gloss, impact resistance, fluidity, weather resistance, and balance therebetween.

(C) First Matting Agent

The first matting agent according to the present invention is a copolymer (PS-g-SAN) obtained through graft polymerization of a styrene-acrylonitrile copolymer to polystyrene, and serves to improve low gloss characteristics of the thermoplastic resin composition, which includes the acrylate-based rubber-modified vinyl graft copolymer as the base resin, together with the second matting agent without deterioration in properties such as impact resistance, external appearance, and the like.

In some embodiments, the first matting agent may include about 20 wt % to about 80 wt %, for example, about 30 wt % to about 70 wt %, of the polystyrene, and about 20 wt % to about 80 wt %, for example, about 30 wt % to about 70 wt %, of the styrene-acrylonitrile copolymer, based on 100 wt % of the copolymer (PS-g-SAN) obtained through graft polymerization of the styrene-acrylonitrile copolymer to the polystyrene. Within this range, the thermoplastic resin composition can exhibit good low gloss characteristics and compatibility.

In some embodiments, the first matting agent may have a weight average molecular weight of about 1,000,000 g/mol to about 10,000,000 g/mol, for example, about 5,000,000 g/mol to about 8,000,000 g/mol, as measured by gel permeation chromatography (GPC). Within this range, the thermoplastic resin composition can exhibit good properties in terms of thermal resistance, impact resistance, formability, and the like.

In some embodiments, the first matting agent may be present in an amount of about 0.1 to about 10 parts by weight, for example, about 0.1 to about 5 parts by weight, specifically about 0.3 to about 3 parts by weight, relative to about 100 parts by weight of the base resin. Within this range, the thermoplastic resin composition can exhibit good properties in terms of low gloss, impact resistance, fluidity, weather resistance, and balance therebetween.

(D) Second Matting Agent

The second matting agent according to the present invention is a copolymer (EGMA-g-SAN) obtained through graft polymerization of a styrene-acrylonitrile copolymer to poly(ethylene-co-glycidyl methacrylate), and serves to improve low gloss characteristics of the thermoplastic resin composition, which includes the acrylate-based rubber-modified vinyl graft copolymer as the base resin, together with the first matting agent without deterioration in properties such as impact resistance, external appearance, and the like.

In some embodiments, the second matting agent may include about 50 wt % to about 80 wt %, for example, about 60 wt % to about 80 wt %, of poly(ethylene-co-glycidyl methacrylate), and about 20 to about 50 wt %, for example, about 20 to about 40 wt %, of the styrene-acrylonitrile copolymer, based on 100 wt % of the copolymer obtained through graft polymerization of the styrene-acrylonitrile copolymer to poly(ethylene-co-glycidyl methacrylate). Within this range, the thermoplastic resin composition can exhibit good low gloss characteristics and compatibility.

In some embodiments, in the second matting agent, the styrene-acrylonitrile copolymer may have a number average molecular weight of about 40,000 g/mol to about 100,000 g/mol, for example, about 50,000 g/mol to about 80,000 g/mol. Within this range, the thermoplastic resin composition can exhibit good properties in terms of low gloss characteristics, formability, and the like.

In some embodiments, the second matting agent may be present in an amount of about 0.1 to about 10 parts by weight, for example, about 0.1 to about 5 parts by weight, specifically about 0.3 to about 3 parts by weight, relative to about 100 parts by weight of the base resin. Within this range, the thermoplastic resin composition can exhibit good properties in terms of low gloss, impact resistance, fluidity, weather resistance, and balance therebetween.

Further, the first matting agent and the second matting agent may be present in a weight ratio (first matting agent: second matting agent) of about 1:0.5 to about 1:2. Within this range, the thermoplastic resin composition can exhibit good properties in terms of low gloss, external appearance, and the like.

The thermoplastic resin composition according to one embodiment of the invention may further include additives, such as flame retardants, antioxidants, lubricants, release agents, nucleating agents, antistatic agents, UV stabilizers, pigments, dyes, and combinations thereof, within a range not adversely affecting the effects of the present invention. The additives may be present in an amount of about 20 parts by weight or less, for example, about 0.1 to about 10 parts by weight, relative to 100 parts by weight of the base resin comprising the acrylate-based rubber-modified vinyl graft copolymer and the aromatic vinyl-vinyl cyanide copolymer resin, without being limited thereto.

In some embodiments, the thermoplastic resin composition may have a gloss of about 1 GU to about 5 GU, for example, about 3 GU to about 4.5 GU, as measured at an angle of 60° in accordance with ASTM D523.

In some embodiments, the thermoplastic resin composition may have a melt flow index (MI) of about 2.5 g/10 min to about 6 g/10 min, for example, about 2.8 g/10 min to about 5 g/10 min, as measured at 220° C. under a load of 10 kg in accordance with ASTM D1238.

In some embodiments, the thermoplastic resin composition may have a notched Izod impact strength of about 20 kgf·cm/cm to about 45 kgf·cm/cm, for example, about 24 kgf·cm/cm to about 45 kgf·cm/cm, as measured on a ⅛" thick specimen in accordance with ASTM D256.

A molded particle according to the present invention is formed from the thermoplastic resin composition. The thermoplastic resin composition according to the present invention may be prepared by any known method for preparing a thermoplastic resin composition. For example, the thermoplastic resin composition may be prepared in pellet form by mixing the above components and optionally other additives by a typical method, followed by melt extrusion in an extruder. The prepared pellets may be formed into various molded articles (products) through various molding methods, such as injection molding, extrusion molding, vacuum molding, cast molding, and the like. Such molding methods are well known to those skilled in the art to which the present invention pertains. The molded article may be useful as an interior/exterior material for automobiles and electric/electronic products. Particularly, the molded article may be used as an interior/exterior material In particular, the molded article has good appearance and low gloss characteristics and thus can be advantageously used as an aesthetically pleasing low gloss material (interior/exterior material).

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows.

(A) Acrylate-Based Rubber-Modified Vinyl Graft Copolymer (A1) As a rubber polymer, an acrylate-styrene-acrylonitrile graft copolymer (g-ASA) prepared through graft copolymerization of 50 wt % of styrene and acrylonitrile (styrene/acrylonitrile (weight ratio)=67/33) to 50 wt % of a copolymer of butyl acrylate and styrene (butyl acrylate/styrene (weight ratio)=85/15) having an average particle diameter of 0.18 μm by emulsion polymerization was used.

(A2) As a rubber polymer, an acrylate-styrene-acrylonitrile graft copolymer (g-ASA) prepared through graft copolymerization of 40 wt % of styrene and acrylonitrile (styrene/acrylonitrile (weight ratio)=67/33) to 60 wt % of butyl acrylate rubber particles having an average particle diameter of 0.32 μm by emulsion polymerization was used.

(B) Aromatic Vinyl-Vinyl Cyanide Copolymer Resin (B1) A styrene-acrylonitrile copolymer (SAN) resin prepared through polymerization of 68 wt % of styrene and 32 wt % of acrylonitrile and having a weight average molecular weight of 120,000 g/mol was used.

(B2) An α-methylstyrene-styrene-acrylonitrile copolymer (AMS-SAN) resin prepared through polymerization of 54 wt % of α-methylstyrene, 19 wt % of styrene and 27 wt % of acrylonitrile and having a weight average molecular weight of 120,000 g/mol was used.

(C) First Matting Agent

A copolymer (PS-g-SAN, Manufacturer: Han Nanotech Co., Ltd., Product Name: AM-07) prepared through graft polymerization of a styrene-acrylonitrile copolymer to polystyrene was used.

(D) Second Matting Agent

A copolymer (EGMA-g-SAN, Manufacturer: NOF Corporation, Product Name: A4400) prepared through graft polymerization of a styrene-acrylonitrile copolymer to poly (ethylene-co-glycidyl methacrylate) was used.

Examples 1 to 4 and Comparative Examples 1 to 5

The aforementioned components were mixed in amounts as listed in Table 1, followed by melting and extrusion in a twin-screw extruder (L/D: 35, Φ: 45 mm) at 240° C., thereby preparing a thermoplastic resin composition in pellet form. The prepared pellets were dried at 80° C. for 2 hours or more and then subjected to injection molding under conditions of an injection molding temperature of 240° C. and a mold temperature: 60° C., thereby preparing a specimen. The prepared specimen was evaluated as to the following properties. Results are shown in Table 1.

Property Evaluation (1) Gloss (unit: GU): Gloss was measured on a specimen having a size of 10 cm×10 cm×0.3 cm at an angle of 60° in accordance with ASTM D523.

(2) Melt-flow Index (MI) (unit: g/10 min): Melt flow index was measured at 220° C. under a load of 10 kg in accordance with ASTM D1238.

(3) Impact strength (unit: kgf·cm/cm): Notched Izod impact strength was measured on a ⅛" thick specimen in accordance with ASTM D256.

(4) Weather resistance: Weather resistance (color resistance, dE) was measured using a weather resistance tester (Manufacturer: Suga Co. Ltd., Product Name: Metaling Vertical Weather Meter MV-3000) after a specimen was left under the following conditions for 200 hours. dE, dL, da and were calculated after measuring L, a and b before and after weather resistance testing using a spectrophotometer (Minolta CM-2500C) in accordance with Equation 1.

Light source: Metal halide lamp
Irradiance: 55 W/m² (530 W/m² at 340 nm)
Temperature: 38° C.
Black panel temperature: 63° C.
Relative humidity: 50%
Test duration (1 cycle, 2 phases): 2 hrs/cycle
L: Lightness
a: red (+)↔green (−)
b: yellow (+)↔blue (−)

$$dE=\sqrt{(dL)^2+(da)^2+(db)^2}$$ [Equation 1]

where dE means a color change, dL is a difference between L values before and after weather resistance testing, da is a difference between a values before and after weather resistance testing, and db is a difference between b values before and after weather resistance testing.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| (A) (A1) (wt %) | 25 | 25 | 25 | — | 25 | 25 | 25 | 25 | 25 |
| (A2) | 17 | 17 | 17 | 42 | 17 | 17 | 17 | 17 | 17 |
| (B) (B1) (wt %) | 29 | 29 | 29 | 58 | 29 | 29 | 29 | 29 | 29 |
| (B2) | 29 | 29 | 29 | — | 29 | 29 | 29 | 29 | 29 |
| (C) (parts by weight) | 1 | 0.5 | 1 | 1 | — | 1.5 | 2 | — | — |
| (D) (parts by weight) | 0.5 | 1 | 1 | 1 | — | — | — | 1.5 | 2 |
| Gloss | 3.8 | 4.2 | 3.3 | 3.0 | 7.9 | 4.5 | 3.0 | 5.3 | 4.8 |
| Melt flow index | 4.2 | 4.0 | 3.8 | 2.8 | 5.8 | 3.5 | 2.3 | 3.5 | 2.0 |
| Notched Izod impact strength | 31.0 | 27.5 | 24.1 | 40.7 | 30.0 | 18.4 | 12.9 | 25.4 | 20.1 |
| Weather resistance | 1.87 | 1.91 | 2.14 | 1.63 | 1.53 | 1.88 | 2.01 | 2.19 | 2.38 |

Parts by weight: parts by weight relative to 100 parts by weight of base resin ((A)+(B))

From the above results, it could be seen that the thermoplastic resin compositions (Examples 1 to 4) according to the present invention had good properties in terms of low gloss, impact resistance, fluidity, and weather resistance.

On the contrary, the thermoplastic composition of Comparative Example 1 prepared without using the first matting agent and the second matting agent was significantly deteriorated in low gloss characteristics, the thermoplastic compositions of Comparative Examples 2 and 3 prepared without the second matting agent were significantly deteriorated in impact resistance and fluidity, and the thermoplastic compositions of Comparative Examples 4 and 5 prepared without the first matting agent had lower properties in terms of low gloss, impact resistance and fluidity than the thermoplastic resin compositions of Examples.

It should be understood that various modifications, changes, alterations, and equivalent embodiments can be made by those skilled in the art without departing from the spirit and scope of the present invention.

The invention claimed is:

1. A thermoplastic resin composition comprising:
   an acrylate-based rubber-modified vinyl graft copolymer;
   an aromatic vinyl-vinyl cyanide copolymer resin;
   a first matting agent; and
   a second matting agent,
   wherein the first matting agent is a copolymer (PS-g-SAN) prepared through graft copolymerization of a styrene-acrylonitrile copolymer to polystyrene and the second matting agent is a copolymer (EGMA-g-SAN) prepared through graft copolymerization of a styrene-acrylonitrile copolymer to poly(ethylene-co-glycidyl methacrylate),
   wherein the thermoplastic resin composition has a gloss of about 1 GU to about 5 GU, as measured at an angle of 60° in accordance with ASTM D523.

2. The thermoplastic resin composition according to claim 1, wherein the thermoplastic resin composition comprises about 0.1 parts by weight to about 10 parts by weight of the first matting agent and about 0.1 parts by weight to about 10 parts by weight of the second matting agent relative to about 100 parts by weight of a base resin comprising about 20 wt % to about 50 wt % of the acrylate-based rubber-modified vinyl graft copolymer and about 50 wt % to about 80 wt % of the aromatic vinyl-vinyl cyanide copolymer resin.

3. The thermoplastic resin composition according to claim 1, wherein the first matting agent and the second matting agent are present in a weight ratio of about 1:0.5 to about 1:2.

4. The thermoplastic resin composition according to claim 1, wherein the acrylate-based rubber-modified vinyl graft copolymer is prepared through graft copolymerization of a monomer mixture comprising an aromatic vinyl monomer and a vinyl cyanide monomer to an acrylate-based rubber polymer.

5. The thermoplastic resin composition according to claim 1, wherein the aromatic vinyl-vinyl cyanide copolymer resin comprises a copolymer of styrene and acrylonitrile, a copolymer of styrene, α-methylstyrene and acrylonitrile, and/or a copolymer of α-methylstyrene and acrylonitrile.

6. The thermoplastic resin composition according to claim 1, wherein the first matting agent has a weight average molecular weight of about 1,000,000 g/mol to about 10,000,000 g/mol.

7. The thermoplastic resin composition according to claim 1, wherein the thermoplastic resin composition has a melt flow index (MI) of about 2.5 g/10 min to about 6 g/10 min, as measured at 220° C. under a load of 10 kg in accordance with ASTM D1238.

8. The thermoplastic resin composition according to claim 1, wherein the thermoplastic resin composition has a notched Izod impact strength of about 20 kgf·cm/cm to about 45 kgf·cm/cm, as measured on a ⅛" thick specimen in accordance with ASTM D256.

9. A molded article formed from the thermoplastic resin composition according to claim 1.

10. A thermoplastic resin composition comprising:
    about 100 parts by weight of a base resin comprising about 20 wt % to about 50 wt % of an acrylate-based rubber-modified vinyl graft copolymer prepared through graft copolymerization of a monomer mixture comprising an aromatic vinyl monomer and a vinyl cyanide monomer to an acrylate-based rubber polymer and about 50 wt % to about 80 wt % of an aromatic vinyl-vinyl cyanide copolymer resin comprising a copolymer of styrene and acrylonitrile, a copolymer of styrene, α-methylstyrene and acrylonitrile, and/or a copolymer of α-methylstyrene and acrylonitrile;

about 0.1 parts by weight to about 10 parts by weight of a first matting agent comprising a copolymer PS-g-SAN prepared through graft copolymerization of a styrene-acrylonitrile copolymer to polystyrene, based on about 100 parts by weight of the base resin; and about 0.1 parts by weight to about 10 parts by weight of a second matting agent comprising a copolymer EGMA-g-SAN prepared through graft copolymerization of a styrene-acrylonitrile copolymer to poly(ethylene-co-glycidyl methacrylate), based on about 100 parts by weight of the base resin, wherein the first matting agent and the second matting agent are present in a weight ratio of about 1:0.5 to about 1:2, and wherein the thermoplastic resin composition has a gloss of about 1 GU to about 5 GU, as measured at an angle of 60° in accordance with ASTM D523.

11. The thermoplastic resin composition according to claim 10, wherein the first matting agent has a weight average molecular weight of about 1,000,000 g/mol to about 10,000,000 g/mol.

12. The thermoplastic resin composition according to claim 11, wherein the thermoplastic resin composition has a melt flow index (MI) of about 2.5 g/10 min to about 6 g/10 min, as measured at 220° C. under a load of 10 kg in accordance with ASTM D1238.

13. The thermoplastic resin composition according to claim 12, wherein the thermoplastic resin composition has a notched Izod impact strength of about 20 kgf·cm/cm to about 45 kgf·cm/cm, as measured on a ⅛" thick specimen in accordance with ASTM D256.

* * * * *